United States Patent

[11] 3,540,692

[72] Inventor Albert J. Balon
 9717 Greenhaven Parkway, Brecksville,
 Ohio 44141
[21] Appl. No. 706,857
[22] Filed Feb. 20, 1968
 Continuation-in-part of application Ser. No.
 501,545, Oct. 22, 1965, now Patent No.
 3,460,804.
[45] Patented Nov. 17, 1970

[54] VALVE AND VALVE TUBE ASSEMBLY
 12 Claims, 4 Drawing Figs.
[52] U.S. Cl. .................................................. 251/149.8
[51] Int. Cl. .................................................. F16l 29/00
[50] Field of Search .......................................... 251/346,
 347, 351, 353, 149.8

[56] References Cited
 UNITED STATES PATENTS
 2,791,236 5/1957 Mauer.......................... 251/351X
 3,184,091 5/1965 Hoffman ....................... 251/351X
 3,203,665 8/1965 Grant et al. ................... 251/351

Primary Examiner—Samuel Scott
Attorney—Bosworth, Sessions, Herrstrom and Cain

ABSTRACT: A valve and valve and tube assembly in which the valve includes a hollow, closed-end fitting having a lateral opening providing a conduit from a gas source to the interior of the fitting, and a second hollow fitting disposed within and being rotatable relative to the first fitting and having a close, sliding and sealing engagement therewith and a lateral opening, axially aligned with the opening in the first fitting, providing communication to the interior thereof, gas flowing from the source to the interior of the second fitting when the fittings are rotated to align the openings, and flow being prevented when the fittings are rotated so as to be nonaligned, the fittings being of similar material so that the valve setting is not affected by relative expansion thereof due to heating and the valve being particularly adapted for use with an assembly to supply gas, with accurate and preset control to a pilot light, and the like.

Patented Nov. 17, 1970 3,540,692
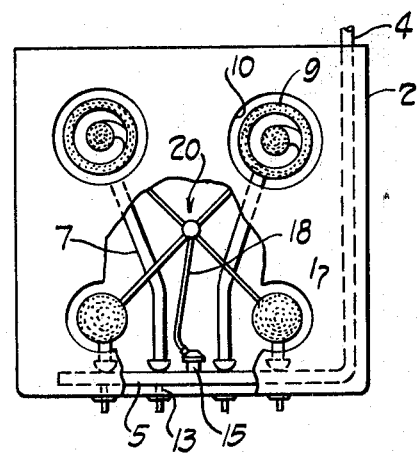
Fig. 1
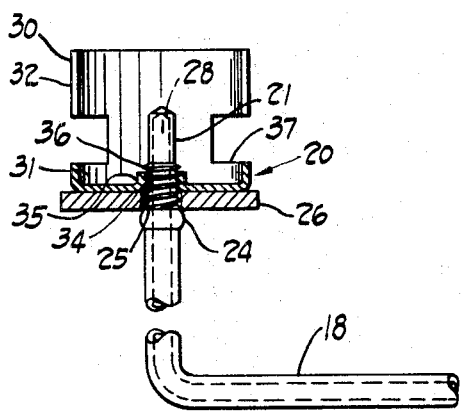
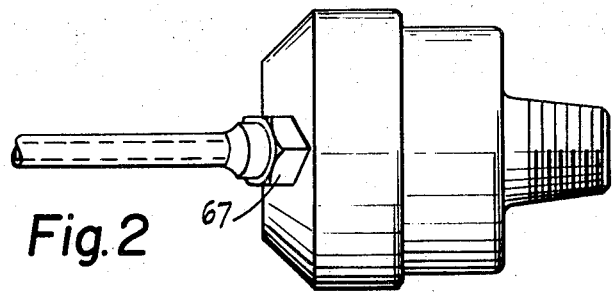
Fig. 2
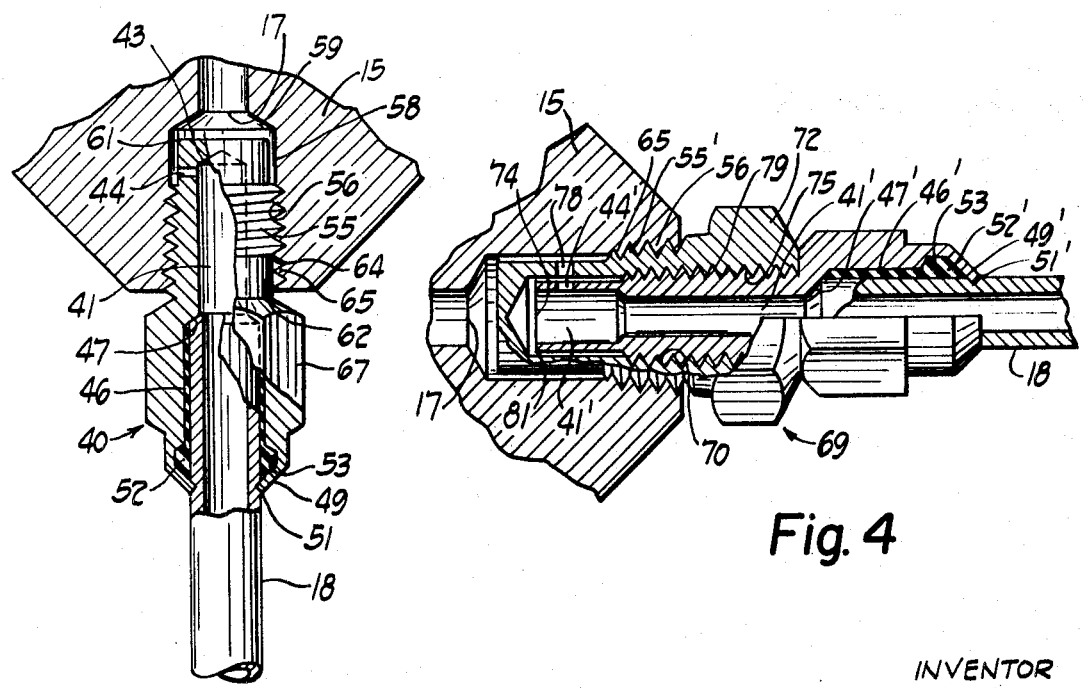
Fig. 3
Fig. 4
INVENTOR
ALBERT J. BALON
BY Bosworth, Sessions
Herrstrom + Cain
ATTORNEYS

VALVE AND VALVE TUBE ASSEMBLY

CROSS REFERENCES TO RELATED APPLICATION

This application is a continuation-in-part of applicant's copending application, Ser. No. 501,545, filed Oct. 22, 1965 now U.S. Pat. No. 3,460,804.

BACKGROUND OF INVENTION

This invention relates to gas stoves and more particularly to a new and improved gas stove valve and tube assembly for pilot lights, and the like.

SUMMARY OF THE INVENTION

It is a general object of this invention to provide a new and improved valve and valve and tube assembly for gas stoves, and the like, obtaining unobvious and unexpected benefits and advantages over prior valves and assemblies.

Another object of this invention is to provide a new and improved valve and tube assembly for gas stoves, and the like, including a new and improved valve and connector for connecting the assembly to the manifold, for controlling the flow of a gas into the assembly and to the pilot light.

Other objects of this invention include the provision of a new and improved valve and valve and connector for a valve and tube assembly for a gas stove, and the like, and the provision of such a valve which is efficient and effective in operation; which is economically manufactured and used; which is safe, simple and foolproof in operation; which is easily adjusted to control or stop the flow of gas through the line; which has only a single moving part yet comprises both valve and coupling or connector by which the valve and tube assembly is secured to the filter, manifold or source of gas supply; which simplifies and improves the valve and coupling structure of prior art gas stove valve and tube assemblies; which complies with accepted safety standards and codes for both manufacture and use; which is simply and effectively mounted on and carried by the tube; which may be used in and with a valve and tube assembly including a pilot light; which accurately controls the flow of gas, including the flow of gas to a pilot light; which is not affected in its operation by heating resulting from the burning of the pilot light or burner controlled thereby; which is easily and accurately set; which provides a constant flame without regard to heating due to the operation of associated or adjacent burners; and which maintains its adjustment whether off or open, as predetermined, without regard to contraction or expansion of the metal comprising the valve and/or the manifold or gas source.

Still other objects of this invention include the provision of a new and improved valve for valve and tube assemblies for gas stoves, and the like, which also functions as a connector or coupling between the tube and gas source; which provides a rotatable or swiveling joint between the tube and valve fitting; which provides a safe and leakproof rotatable or swiveling joint between the tube and valve fitting; which provides an axial connection and interconnection between the gas source and the tube; which provides a range of adjustable flow control, including no flow; which is adjustable without danger of leakage from the connector; which provides for simple and relative adjustment for a plurality of assemblies from a single filter or distributor so as to obviate the need for equal length pilot light tube assemblies; and which provides a new and improved seal between the valve and the socket within which the same is mounted.

Other objects of this invention include the provision of a new and improved valve for valve and tube assemblies, and the like, which is an axially acting valve providing a new and improved seal between the valve and the valve socket; which provides a safe and effective seal between valve and socket wherein the valve is adjustable without destruction of the seal; which utilizes the forces of the gas pressure in the source and resistance to tightening the valve into the socket to provide a better and more efficient seal; which has structure providing fast bleeding of the tube when the valve is turned on; which is easily positioned and mounted in a complementary socket of a supply source; which is easily and accurately adjusted and maintains adjustment even though heated during operation and use; and which is a new and unobvious structure obtaining new objects and advantages with new simplicity and at reduced cost.

Still another object of this invention is to provide a new and improved valve and a new and improved valve and tube assembly for gas stoves, and the like, obtaining one or more of the objects and advantages set forth above.

These and other objects and advantages of this invention will appear from the following description of preferred forms thereof, reference being had to the accompanying drawings.

BRIEF DESCRIPTION OF THE DRAWINGS

FIG. 1 is a plan view, partly broken away, of a stove having a valve and tube assembly embodying this invention;

FIG. 2 is a view, partly in elevation and partly in section, showing a valve and tube assembly embodying this invention;

FIG. 3 is an enlarged view, partly in elevation and partly in section, showing a valve embodying a preferred form of this invention; and FIG. 4 is an enlarged view, partly in elevation and partly in section, showing another valve embodying another preferred form of this invention.

DESCRIPTION OF THE PREFERRED EMBODIMENTS

This invention is useful in gas cooking stoves, and the like, and comprises a new and improved valve and tube assembly for a gas pilot light, and the like, including a new and improved valve, and a new and improved valve and connector.

A valve and tube assembly, indicated generally at 1, FIG. 1, embodying this invention is shown, by way of example, in use on a conventional gas stove 2, having a gas supply line 4 terminating in a conventional manifold 5 from which a plurality of branch, feed or supply lines 7 lead to the respective burners 9, which are situated in openings 10 in stove top 12. Lines 7 are controlled, respectively, by valves 13. When a valve 13 is opened and the gas flows to the respective burner 9, the same is lighted by a pilot light which is also supplied from manifold 5 via a combination filter and distributor 15. Filter 15 is provided with a single threaded inlet for connection with manifold 5 and a number of tapped sockets or outlets 17 (FIG. 3 and 4) equal to the number of pilot lights to be supplied therefrom. The entire pilot light apparatus including distributor, tube or pipe, pilot light member and housing is conventionally known as the harness.

All of the above is old and, per se, forms no part of the present invention.

Valve and tube assembly 1 includes a small tube or pipe 18 formed of suitable material, such as aluminum, and providing a gas conduit between the filter 15 and the pilot light, indicated generally at 20, which is shown as embodying the structure, junction, mode of operation and result of the pilot light in applicant's copending application, which is a division of the application of which this application is a continuation-in-part, but which may be of any desired, known or conventional structure.

To provide pilot light 20, as shown, tube 18 is provided, at its outer end 21, with external threads 22, and, just inwardly thereof, with an external shoulder 24. Shoulder 24 is adapted to function as a stop for positioning and mounting or supporting the pilot light on the stove. Accordingly, end 21 of tube 18 extends through an aperture 25 in a support or bar 26, which is a part of the structure of stove 2. Aperture 25 has a diameter greater than the external diameter of threads 22 but less than external diameter of stop or shoulder 24. Thus, end 21 can only enter into aperture 25 until support 26 seats on shoulder 24. End 21 and threads 22 extend outwardly from shoulder 24 and above support 26 sufficiently so that threads 22 may be engaged and tightened upon above the support.

Shoulder 24 is formed integrally with and as a unitary part of tube 18, just inwardly of threads 22, by swagging, or other suitable means.

The pilot burns at one or more small orifices 28 provided at the end 21 of tube 18. The flame is protected, the pilot light mounting completed and the pilot light held in place by means of a pilot light housing 30. Housing 30 is conveniently shaped and formed from a single piece of sheet metal to provide a cuplike member having base 31 and side wall 32. Base 31 is of greater external diameter than aperture 25 and has a central aperture 34 surrounded by internally extending wall or sleeve 35 having threads 36 which are complementary to and engage threads 22 so that housing 30 may be tightened upon threads 22 and against support 26 to mount and hold the pilot light in position.

End 21 of tube 18 preferably extends, as shown, above threads 22 a short distance so as to position the flame higher within housing 30 and housing 30 is preferably provided with apertures or inlets 37 in wall 32 so that air may flow into the housing from below the level of the flame to provide a proper oxygen supply therefor.

As noted above, valve and tube assembly 1 also includes a new and improved valve and coupling for coupling the pilot light tube to the filter 15 and controlling the flow of gas from the manifold to the pilot light.

One form of valve embodying this invention comprises a single fitting 40 extending axially from the end of tube 18 and obviating the need for a separate coupling and valve mechanism while providing a wide range of easily adjusted flow control, including stoppage of all flow, without leakage or similar danger. Further, fitting 40, in this embodiment of the invention, also, provides for relative rotational movement between the tube 18 and filter 15, thereby providing both swiveling or rotation of the pilot light relative to the filter and adjustment of the valve, with attendant rotation of the fitting 40, relative to the tube 18 without otherwise disturbing the completed assembly, introducing gas leaks, or interfering with the pilot light or the valve and tube assembly, its mounting on the stove connection with the manifold and/or its function.

More particularly, as best seen in FIG. 3, fitting 40 is of generally cylindrical shape with a hollow interior 41 which is in direct communication with the interior of tube 18. Interior 41 is closed at its outer or valve end by wall 43 and a lateral passageway or bore 44, provides an inlet to interior 41.

In order to rotatably mount fitting 40 on tube 18, the interior 41 is counterbored as at 46 to provide an interior diameter having a sliding fit with the exterior of tube 18 and a seat 47 against which the tip of the tube seats when the fitting and tube are assembled.

In addition, fitting 40 is formed with an axially extending flange or lip 49, having a greater internal diameter than counterbore 46 and length sufficient so that the lip can be deformed, as by spinning, into biting and sealing engagement with tube 18, as shown at 51. Engagement 51 is circumferential and not only prevents disengagement of the tube and fitting but also provides for swiveling or relative rotation between the fitting 40 and tube 18 to and for the purposes set forth above.

The engagement 51 is effected, on the one hand, because fitting 40 is harder than tube 18 and is rendered more effective, on the other hand, by first coating tube 18 with a sealant 52, such as a grease remaining stable up to 750°F. Tube 18 is coated with sealant 52 before fitting 40 is slipped over the end, and, as the tube is spun to effect the swivel joint by forcing lip 49 into tube 18 with a suitable tool, the sealant in part remains between the fitting and tube along the meeting cylindrical portions thereof, i.e., along counterbore 46 and in part collects in and packs and seals in the relief 53, immediately adjacent the engagement 51.

The connection between fitting 40 and tube 18 is, thus, leakproof and rotatable, and, although unobvious, obtains the other objects and advantages of this invention in this respect.

In order to connect the tube 18 with the filter 15 in an adjustable, sealing engagement, fitting 40 is provided with external threads 55, spaced slightly from the end 43 of the fitting and adapted to have a loose fit with the internal threads 56 in the socket or bore 58 of the filter so that the fitting may be easily and readily engaged in and hand-tightened into the filter. The length of fitting 40 from end 43 to the end of threads 55 remote from end 43 is less than the depth of the bore 58 between the bore seat 59 and the outer end of the threads 56, so that the fitting is not seated at the completion of hand-tightening. In addition, seat 59 is tapered and end 43 of fitting 40 is provided with a noncomplementary chamfer or radius 61 so that a line engagement is effected between the fitting 40 and the seat 59 when the fitting is fully seated and tightened into the filter.

The lateral bore 44 opens intermediate the end 43 and the threads 55 of fitting 40 so that the gas, under manifold pressure, may flow about end 43 and through bore 44 into the interior 41 of fitting 40 and thence through the tube 18 to the pilot light 20, when the valve is opened, but is stopped or turned off when the chamfer 61 engages seat 59.

In order to provide a gastight seal between the fitting 40 and filter 15, when the valve is opened and in order to facilitate the engagement and mounting of the fitting (valve) and pipe in the filter, threads 55 have a and engaged. fit with threads 56 of the filter, so that the fitting can be positioned easily in the filter and then hand-tightened for the length of the threads 55 to complete the initial engagement. Further, threads 55 are held to a relatively few in number and immediately inwardly thereof, downwardly as viewed in FIG. 3, fitting 40 is provided with a cylindrical body portion or shank 62, which has an external diameter slightly greater than the minimum internal diameter of the threads 56 on the filter.

Thus, the fitting is easily hand-tightened for the length of the threads 55 actually until the leading edge 64 of shank 62 engages the top of the first or outermost thread of threads 56 and so the fitting is easily mounted and engaged. Further, the length of the fitting intermediate end 43 and the leading edge 64 of shank 62 is such, relative to the depth of the bore 58 in filter 15, that the end 43 and chamfer 61 of fitting 40 are spaced from seat 59 of the filter, when hand-tightened, a distance greater than the distance between chamfer and seat in the open position by enough to provide a sealing engagement between the lateral wall of shank 62 and the threads 56 in the manner of this invention, when assembly of the fitting therein is completed as set forth below.

The seal develops and forms as the fitting is turned further into the socket 58, after engagement between edge 64 and outermost thread 56, by conventional means, such as a wrench. The fitting, having a greater diameter, at shank 62 and being of harder material (brass vs. aluminum, for example) deforms and distorts the tips of threads 56, as shown in FIG. 3, at 65, for example, so that a sealing engagement is formed as the fitting is tightened until fully seated with chamfer 61 in engagement with seat 59. Also, the seal 65 is such that the fitting may be backed off to open the valve, and the valve be adjusted, without loss of seal, so that gas flowing past the open valve is diverted through the aperture 44 and, into the interior 41 of fitting 40, as set forth above.

Further, the resistance to the entry of the fitting 40 into the socket 58, as shank 62 engages and deforms the threads 56, has the effect, as applicant understands it, of displacing the threads 55 of fitting 40 outwardly relative to the threads 56 of filter 15, because of the "drag" on, or resistance to, the fitting as shank 62 enters into the socket 58 with the result that the threads 55 and 56 mate and engage tightly on the outwardly side of threads 55 and the inwardly side of threads 56. And, of course, the pressure of gas within the system and on the inlet side of the valve also tends to strengthen this seal since there is no pressure on the exit side of the valve, the pilot light orifice being in free and open communication with the atmosphere, at all times.

Fitting 40, as shown, also, has the advantage of having a flat end and a large circumferential engagement (between chamfer 61 and seat 59) when closed, with the result that opening of the valve provides fast "bleeding" of the gas through the "valve opening" around the end of the fitting and into the aperture 44, interior 41 of the fitting 40 and tube 18, so that tube 18 is cleared quickly of air (filled with gas) to provide for lighting of the pilot light markedly faster than with valves now commonly used for such purposes.

Fitting 40 is also conveniently provided with a hexagonal, as shown, or other noncircular, exterior body portion 67, FIGS. 2 and 3, in order to facilitate engagement of the fitting by a wrench, or the like, in order to tighten the same, and open and close the valve.

Another valve, indicated generally at 69, embodying another preferred form of this invention is shown in FIG. 4, wherein like reference characters refer to like parts, as in FIG. 3.

This form of valve is particularly useful in obviating changes in gas flow and, therefore, in the height and size of the pilot flame due to heating of the valve resulting from operation of the pilot light or burners, and to provide an extremely fine, accurate and precise adjustment and setting of the pilot flame to a desired predetermined characteristic, which will exist throughout the operation of the stove or the like, without regard to heating, whether incidental, accidental or intentional, of the harness during use of the apparatus while, at the same time, obtaining and recognizing all, or one or more, of the objects and advantages of the form of the valve depicted in FIG. 3 and described above.

More particularly, valve 69 comprises inner and outer fitting members 70 and 72, respectively, which are disposed and mounted for coaction between the filter 15 and the tube 18.

Fitting members 70 and 72 are preferably formed, for a purpose to be hereinafter more fully described, of the same metal or material, so that they have the same coefficient of expansions and expand and contract together and at the same rate when subjected to heating and/or cooling, as is common in the normal use and operation of the assemblies of which the valve 69 are a part.

Further, inner fitting 70 may be substantially the same in structure as the fitting 40 just described or may be modified, if found convenient, as shown in FIG. 4 to have an open end, as at 74 instead of the closed end 43, and, when, as preferred, both fittings are made of brass or similar material the threads 75 thereof may be tapered to facilitate engagement of the fittings, but they need not be foreshortened, as in fitting 40, to provide a shank for distorting the mating threads, while permitting axial displacement of the fitting, during operation of the valve in order to seat and unseat the same, i.e. turn the valve on and off.

Rather, in its preferred and convenient form, fitting 70, includes a counter bore 46', seat 47' and flange or lip 49 which are similar, respectively, in structure, function and result to the similarly numbered portions of fitting 40, and, as with fitting 40, flange 49' is displaced inwardly into biting engagement, as at 51', with tube 18 to affect a swiveling or rotatable juncture between the tube 18 and the fitting 70.

Also, as with fitting 40, a sealant 52' is disposed between the flange and tube and fills the relief 53' when the junction is completed.

Fitting 70, is also hollow, as at 41' to provide a gas passage or conduit through the fitting and between the filter 15 and tube 18.

In addition fitting 70 has a smooth, cylindrical tip or end portion 74, with a lateral bore or aperture 44' therein to provide communication with and a gas passage to the interior passage 41'.

Fitting 72 is similar to fitting 40 of the form of the invention described above to the extent that it has exterior threads 55' for engaging and coacting with the threads 65 of the filter 15 to the end that the valve 69 may be mounted in and coact with the filter 15. Also, fitting 70 has a hollow interior 76, a closed end 43' and a lateral bore 78, near its closed end 43, to provide communication with and a gas passage to the interior 76.

Fitting 72 is also provided with interior threads 79, for coaction with the threads 74 of fitting 70. Threads 79 extend only partially along the interior 76 of fitting 72 so as to provide an inner, smooth cylindrical portion 81, through which the bore 78 extends. Cylindrical surfaces 74 and 81 are so sized and proportioned, in view of the diameters of threads 75 and 79 and the length of interior 76, that the said surfaces have a mating, sliding and sealing engagement with each other when fitting 70 is seated and threaded within fitting 72. Further, bores 44' and 78 are positioned so as to be in axial alignment when fitting 70 is fully threaded into and seated in fitting 72 and, when aligned radially, bores 44' and 78 provide a gas passage from the filter into the interior 41' of fitting 70, the magnitude of the flow depending on the degree of radial alignment of the said bores and being adjustable, with just a few degrees of radial turning, since the bores are, in fact, of small diameter, from a position of entirely off to one of full flow and having a full range of easily and accurate adjustments therebetween.

In addition, the exterior of the inner end of fitting 72 has a loose or free fit with the socket so that the gas may flow easily around the closed end of fitting 72 and to the bore 78.

In practice, the fittings 70 and 72 are assembled with the bores radially aligned and the fitting 70 as fully seated as possible, in view thereof. When the harness is assembled into the stove, fitting 72 is fully tightened into the filter, the rotatable juncture between fitting 70 and tube 18 permitting assembly of the valve into the filter without affecting the adjustment between the bores 44' and 78 (radial adjustment between the fittings 70 and 72).

Once the valve 69 is seated in the filter, the inner fitting 70 is turned, back off, to misalign the bores 44' and 78 to provide an accurate and predetermined flow, which, when, as preferred, the fittings 70 and 72 are of the same material, remains constant throughout operation and without regard to heating and cooling of the fittings during use because the fittings have the same coefficient of expansions. Thus the height, size or magnitude of the pilot flame remains constant during the complete cycle of operation of the stove, or the like, within which the harness is used, day in and day out, yet may be readjusted or turned off easily, when and as desired.

While the valve and tube assembly of this invention has been described as a unit, it is to be understood that valves, embodying this invention may be used with tubes having other pilot house structures and in other and different applications wherein valves obtaining the objects and advantages of this invention are or may be useful and advantageous.

Modifications and changes to the preferred forms of the invention disclosed herein may occur to those skilled in the art who come to understand the principles and precepts thereof. Accordingly, the scope of the patent to be issued hereon should be limited not to the forms of the invention herein specifically depicted and described, but by the advance by which the invention has promoted the art.

I claim:

1. A valve comprising a body member having a socket and fitting means having a longitudinal axis, said socket comprising a bore having a side wall with internal thread means therein, and a central orifice through which fluid flows into said socket bore, said fitting means comprising inner and outer fitting members, said outer fitting member having external thread means for engagement with said thread means of said body member and a hollow interior having a closed end and a smooth, cylindrical interior surface extending from said closed end a predetermined distance, said outer fitting member also having internal thread means of greater diameter than said smooth cylindrical surface and spaced from said closed end by said smooth cylindrical surface, a lateral bore in said outer fitting member intermediate said closed end and said outer fitting internal thread means, said external thread means on said outer fitting member being more remote from said closed end than said lateral bore, said inner fitting member having an end, a longitudinal bore in said inner fitting member, external thread means on said inner fitting member for engaging and coacting with said internal thread means of said outer fitting member, a smooth, external cylindrical surface on said inner fitting member intermediate said end of said inner fitting member and said external thread means thereof, and a lateral bore in said inner fitting member providing communication with said longitudinal bore, said smooth cylindrical surfaces of said outer and inner fitting members, respectively, having a mating, sliding and sealing fit, said lateral bores of said inner and outer fitting members being aligned longitudinally relative to said fitting members and radially when said inner fitting member is seated in said outer fitting member, rotation of said inner fitting member about said longitudinal axis through a small angle relative to said outer fitting member controlling the radial alignment of said lateral bores and, thereby, the flow of fluid therethrough.

2. The valve according to claim 1 in which both said fitting members are made of the same material.

3. The valve according to claim 1 in which said fitting members have the same coefficient of expansion adjacent said lateral bores.

4. The valve according to claim 1 including a tube disposed in said longitudinal bore of said inner fitting member and extending longitudinally therefrom in a direction away from said end, thereof, a flange on said inner fitting member extending in spaced, parallel relation with said tube and being bent inwardly into biting engagement with said tube, and sealant means disposed between said flange and said tube, said engagement between said flange and tube providing for relative rotational movement about said longitudinal axis between said tube and said inner fitting member.

5. The valve according to claim 4 in which said fitting means is counterbored to form an internal seat about said longitudinal bore more remote from said closed end than said lateral bore means and said tube is disposed against said seat.

6. The valve according to claim 4 in which both said fitting members are made of the same material.

7. The valve according to claim 4 in which said fitting members have the same coefficient of expansion adjacent said lateral bores.

8. A valve means comprising inner and outer members having coincident axes, said outer member having a hollow interior with a closed end, a smooth cylindrical interior surface in said outer member and extending from said closed end a predetermined distance, said outer member also having internal thread means of greater diameter than said smooth cylindrical surface and spaced from said closed end by said smooth cylindrical surface, a lateral bore in said outer member intermediate said closed end and said internal thread means, external thread means on said outer member and more remote from said closed end than said lateral bore, said inner member having an end and a hollow interior and being disposed, at least in part, within said outer member, external thread means on said inner member for engaging and coacting with said internal thread means of said outer member, a smooth, external cylindrical surface on said inner member intermediate said end of said inner member and said external thread means thereof, a lateral bore in said inner member, said smooth cylindrical surfaces of said outer and inner members, respectively, having a mating, sliding and sealing fit adjacent said lateral bores, and said lateral bores of said inner and outer members being aligned axially relative to said members and radially when said inner member is seated in said outer member, rotation of said inner member about said axis through a small angle relative to said outer member controlling the radial alignment of said bores and, thereby, the flow of fluid through said valve means.

9. Valve means according to claim 8 in which both said members are made of the same material.

10. Valve means according to claim 8 in which said members have the same coefficient of expansion adjacent said lateral bores.

11. Valve means according to claim 8 with a tube disposed in said hollow interior of said inner member and extending axially therefrom in a direction away from said end, a flange means on said inner member extending in spaced parallel relation with said tube and being bent inwardly into biting engagement with said tube, and sealant means disposed between said flange means and said tube, said engagement between said flange means and tube providing for relative rotational movement about said axis between said tube and inner member.

12. Valve means according to claim 11 in which said inner member is counterbored to form an internal seat about said hollow interior more remote from said end than said lateral bore and said tube is disposed against said seat.